(12) United States Patent
Iwase et al.

(10) Patent No.: US 8,969,480 B2
(45) Date of Patent: Mar. 3, 2015

(54) POLYMER ALLOY AND RUBBER PRODUCT, AND PRODUCTION METHOD THEREOF

(75) Inventors: Naoki Iwase, Kiyosu (JP); Hideyuki Imai, Kiyosu (JP); Akishige Seo, Kiyosu (JP); Hideaki Kondo, Kiyosu (JP); Yusuke Katono, Kiyosu (JP)

(73) Assignee: Toyoda Gosei Co., Ltd., Aichi-pref. (JP)

( * ) Notice: Subject to any disclaimer, the term of this patent is extended or adjusted under 35 U.S.C. 154(b) by 12 days.

(21) Appl. No.: 13/984,563

(22) PCT Filed: Nov. 21, 2011

(86) PCT No.: PCT/JP2011/076793
§ 371 (c)(1),
(2), (4) Date: Oct. 1, 2013

(87) PCT Pub. No.: WO2012/114591
PCT Pub. Date: Aug. 30, 2012

(65) Prior Publication Data
US 2014/0018503 A1    Jan. 16, 2014

(30) Foreign Application Priority Data

Feb. 25, 2011  (JP) ................................ 2011-040807

(51) Int. Cl.
| | | |
|---|---|---|
| *C08L 15/00* | (2006.01) | |
| *C08L 21/00* | (2006.01) | |
| *C08L 19/00* | (2006.01) | |
| *C08C 19/22* | (2006.01) | |
| *C08L 23/16* | (2006.01) | |
| *C08L 9/02* | (2006.01) | |

(52) U.S. Cl.
CPC ............... *C08L 19/006* (2013.01); *C08L 15/00* (2013.01); *C08C 19/22* (2013.01); *C08L 23/16* (2013.01); *C08L 9/02* (2013.01)
USPC .......................................... 525/211; 525/238

(58) Field of Classification Search
CPC ......... C08L 15/00; C08L 23/16; C08L 33/08; C08L 19/22; C08L 9/02; C08L 33/04; C08L 19/006
USPC ................................................... 525/211, 238
See application file for complete search history.

(56) References Cited

U.S. PATENT DOCUMENTS

| 5,428,099 A | * | 6/1995 | Morrar et al. ................. 524/495 |
| 6,355,826 B1 | | 3/2002 | Parker |

FOREIGN PATENT DOCUMENTS

| JP | 11-180943 A | 7/1999 |
| JP | 2000-143874 A | 5/2000 |
| JP | 2004-323629 A | 11/2004 |
| JP | 2006-022237 A | 1/2006 |
| JP | 2008-163232 A | 7/2008 |

OTHER PUBLICATIONS

International Search Report of the International Searching Authority mailed Dec. 20, 2011 for the corresponding international application No. PCT/JP2011/076793 (with English translation).
International Preliminary Report on Patentability mailed Sep. 6, 2013 for the corresponding international application No. PCT/JP2011/076793 (with English translation).

* cited by examiner

*Primary Examiner* — Nathan M Nutter
(74) *Attorney, Agent, or Firm* — Posz Law Group, PLC

(57) ABSTRACT

To provide a polymer alloy formed of a non-polar rubber and a polar rubber, and a rubber product, which are improved in ozone resistance (weather resistance) while having oil resistance and can achieve high mechanical strength (in particular, tensile strength), and a production method thereof.

A rubber product in which an organic peroxide or other cross-linking agent is used to cross-link a polymer alloy comprising: a modified rubber in which EPDM, NR, or another non-polar rubber having a non-conjugated double bond is modified with 2-methoxy-1-naphthonitrile oxide, 2,6-dimethoxybenzonitrile oxide, or another nitrile oxide of an aromatic nitrile oxide derivative; and nitrile rubber, acrylic rubber, or another polar rubber.

16 Claims, 2 Drawing Sheets

F I G. 1
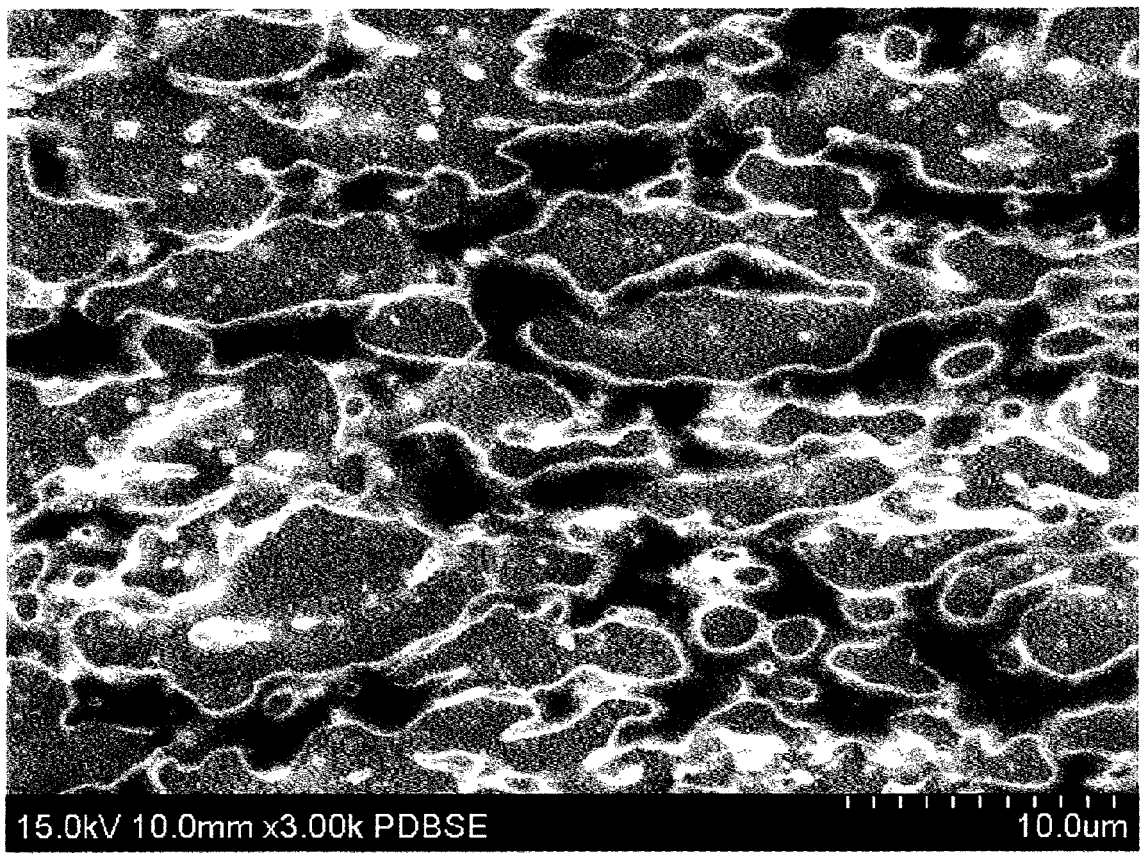

POLYMER ALLOY AND RUBBER PRODUCT, AND PRODUCTION METHOD THEREOF

CROSS REFERENCE TO RELATED APPLICATIONS

This application is a U.S. national stage application of PCT/JP2011/076793 filed on Nov. 21, 2011, and claims priority to, and incorporates by reference, Japanese Patent Application No. 2011-040807 filed on Feb. 25, 2011.

TECHNICAL FIELD

The present invention relates to a polymer alloy including a modified rubber in which a non-polar rubber having a non-conjugated double bond is modified, and a rubber product formed of the polymer alloy, and a production method thereof.

BACKGROUND

Polymer alloys have been developed, in which polymers having different properties (for example, a non-polar rubber and a polar rubber) are mixed to combine superior properties of such polymers.

One of those studied is a polymer alloy having oil resistance and ozone resistance, which is formed by mixing a rubber such as acrylonitrile-butadiene rubber (NBR) superior in oil resistance and inferior in ozone resistance and a rubber such as ethylene-propylene-diene copolymer rubber (EPDM) superior in ozone resistance and inferior in oil resistance.

For example, Patent Document 1 describes a polymer alloy of NBR and EPDM in which a graft copolymer formed by graft-copolymerizing acrylonitrile and styrene with EPDM is added. Patent Document 2 describes a polymer alloy of NBR and a modified EPDM modified with a hydroxy group. Patent Document 3 describes a polymer alloy of a copolymer of acrylonitrile, butadiene, glycidyl acrylate, and so forth, EPDM, and a modified EPDM modified with maleic anhydride.

PATENT DOCUMENTS

Patent Document 1: Japanese Patent Application Publication No. 2004-323629 (JP 2004-323629 A)
Patent Document 2: Japanese Patent Application Publication No. 2006-22237 (JP 2006-22237 A)
Patent Document 3: Japanese Patent Application Publication No. 2000-143874 (JP 2000-143874 A)

The polymer alloy in Patent Document 1, however, is expensive because it is necessary to produce a graft copolymer of EPDM and satisfactory performance is not exhibited unless two kinds of NBRs different in molecular weight are used. In the polymer alloys in Patent Documents 2 and 3, EPDM may be damaged because modification of EPDM is performed at high temperatures (about 180° C. or higher) (see Comparative Example 4 in Table 1).

SUMMARY

The present invention aims to provide a polymer alloy formed of a non-polar rubber and a polar rubber, and a rubber product, which are improved in ozone resistance (weather resistance) while having oil resistance and can achieve high mechanical strength (in particular, tensile strength), and a production method thereof.

According to the present invention, a non-polar rubber having a non-conjugated double bond is modified with a particular nitrile oxide, thereby improving compatibility with a polar rubber. Accordingly, while having oil resistance, ozone resistance (weather resistance) is improved compared with a polymer alloy of a not-modified non-polar rubber and a polar rubber.

A non-polar rubber is modified by allowing a particular nitrile oxide and a non-polar rubber having a non-conjugated double bond to react at mild temperatures of 0 to 180° C., thereby yielding a modified rubber without damaging the non-polar rubber. Thus, mechanical strength (in particular, tensile strength) is increased.

A polymer alloy according to the present invention is formed of: a modified rubber in which a non-polar rubber having a non-conjugated double bond is modified with nitrile oxide of an aromatic nitrile oxide derivative having a substituent group at an ortho position of a nitrile oxide group of an aromatic nitrile oxide in which the nitrile oxide group is bonded to an aromatic ring; and a polar rubber.

A rubber product according to the present invention is formed by cross-linking the polymer alloy.

A production method of a polymer alloy according to the present invention includes the steps of: allowing nitrile oxide of an aromatic nitrile oxide derivative having a substituent group at an ortho position of a nitrile oxide group of an aromatic nitrile oxide in which the nitrile oxide group is bonded to an aromatic ring to react with a non-polar rubber having a non-conjugated double bond at 0 to 180° C. to modify the non-polar rubber into a modified rubber; and kneading the modified rubber and a polar rubber.

A production method of a rubber product according to the present invention includes the steps of: allowing nitrile oxide of an aromatic nitrile oxide derivative having a substituent group at an ortho position of a nitrile oxide group of an aromatic nitrile oxide in which the nitrile oxide group is bonded to an aromatic ring to react with a non-polar rubber having a non-conjugated double bond at 0 to 180° C. to modify the non-polar rubber into a modified rubber; kneading the modified rubber and a polar rubber to form a polymer alloy; and cross-linking the polymer alloy.

BRIEF DESCRIPTION OF THE DRAWINGS

FIG. 1 is a microscope photograph of apart of a surface of a rubber body of Example 3.

DETAILED DESCRIPTION

Figure 2:
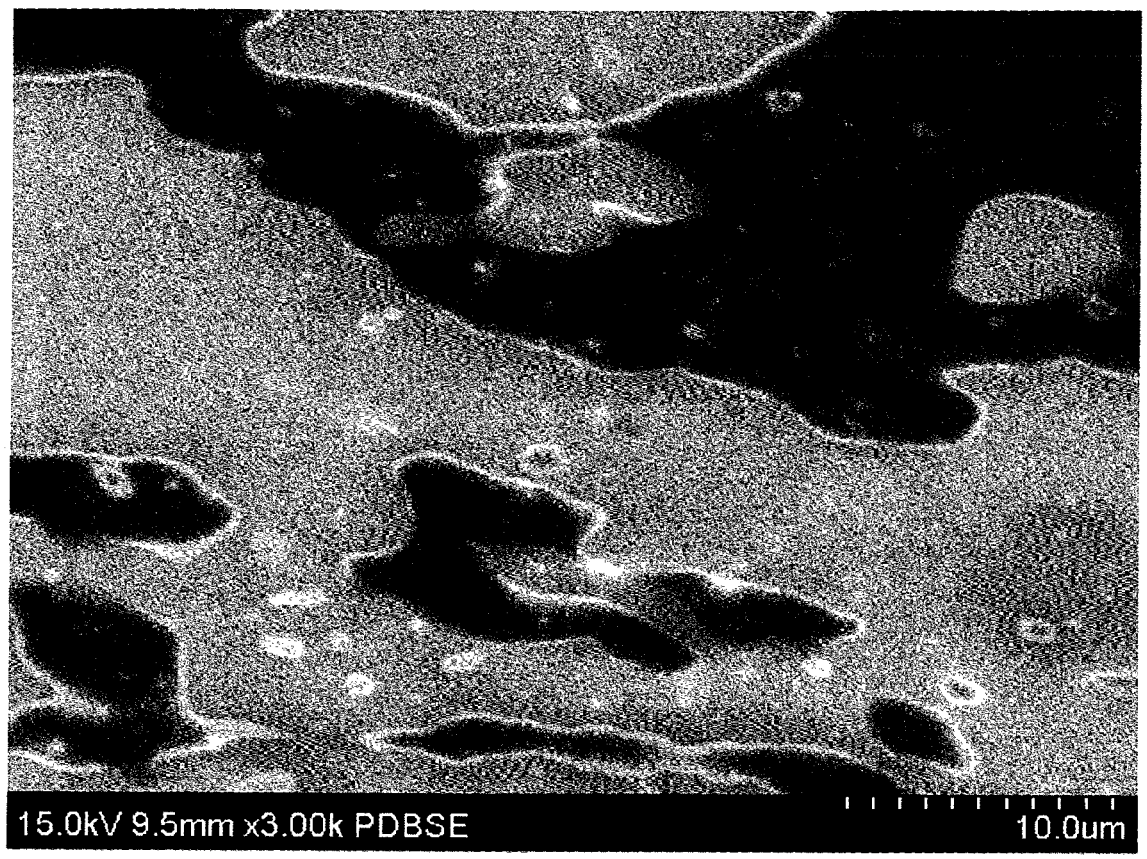
FIG. 2 is a microscope photograph of apart of a surface of a rubber body of Comparative Example 1.

Embodiments of elements in the polymer alloy and the rubber product, and the production method of the polymer alloy and the production method of the rubber product according to the present invention are illustrated below.

1. Modified Rubber

As the modified rubber, a non-polar rubber is modified such that a non-polar rubber undergoes addition reaction with nitrile oxide so that isoxazoline is introduced (see Formula 4). Accordingly, compatibility with a polar rubber is improved, and as shown in FIG. 1, one of the phase of the modified rubber and the phase of the polar rubber is finely dispersed in the other phase and becomes uniform.

The blended amount of the modified rubber is 20 to 80 parts by mass when the entire rubber component is 100 parts by mass, only by way of example, although not particularly limited thereto.

2. Non-Polar Rubber

The non-polar rubber is a rubber not including a heteroatom such as nitrogen, oxygen, chlorine, and fluorine, that is, a rubber only formed of carbon and hydrogen.

Examples of the non-polar rubber may include ethylene-propylene-diene copolymer rubber (EPDM), natural rubber (NR), isoprene rubber (IR), butadiene rubber (BR), styrene-butadiene rubber (SBR), and isobutylene isoprene rubber (IIR), although not particularly limited thereto.

3. Nitrile Oxide

Nitrile oxide of an aromatic nitrile oxide derivative having a substituent group at an ortho position of a nitrile oxide group of an aromatic nitrile oxide in which the nitrile oxide group is bonded to an aromatic ring is relatively stable and therefore easy to handle, and reacts with a non-conjugated double bond of a non-polar rubber without using a catalyst even at temperatures of 0 to 180° C. and can modify the non-polar rubber (introduce isoxazoline).

Examples of the aromatic nitrile oxide may include benzonitrile oxide and naphthonitrile oxide, although not particularly limited thereto.

The substituent group is preferably a substituent group excluding a fluoro group (F), a hydroxy group (OH), an amino group ($NH_2$), and a hydro group (H), and more preferably an alkyl group or an alkoxy group, although not particularly limited thereto.

The alkyl group is preferably a linear or branched $C_{1-20}$ alkyl group, more preferably a linear or branched $C_{1-4}$ alkyl group, such as a methyl group, an ethyl group, an n-propyl group, an iso-propyl group, an n-butyl group, a sec-butyl group, an iso-butyl group, or a tert-butyl group, although not particularly limited thereto.

The alkoxy group is preferably a linear or branched $C_{1-4}$ alkoxy group, more preferably a linear or branched $C_{1-3}$ alkoxy group, such as a methoxy group, an ethoxy group, an n-propoxy group, and an iso-propoxy group, although not particularly limited thereto.

Examples of the aromatic nitrile oxide derivative may include 2,6-dimethoxybenzonitrile oxide, 2,6-diethoxybenzonitrile oxide, and 2-methoxy-1-naphthonitrile oxide, although not particularly limited thereto.

4. Polar Rubber

The polar rubber is a rubber including a heteroatom, that is, a rubber formed of carbon and hydrogen, and a heteroatom such as nitrogen, oxygen, chlorine, and fluorine.

Examples of the polar rubber may include nitrile rubbers such as acrylonitrile-butadiene rubber (NBR) and hydrogenated nitrile rubber (HNBR), acrylic rubbers such as acrylic ester-2-chloroethyl vinyl ether copolymer rubber (ACM) and acrylic ester-acrylonitrile copolymer rubber (ANM), chloroprene rubber (CR), urethane rubber (U), and epichlorohydrin rubber (CO), although not particularly limited thereto.

The blended amount of the polar rubber is 20 to 80 parts by mass when the entire rubber component is 100 parts by mass, only by way of example, although not particularly limited thereto.

5. Polymer Alloy

The polymer alloy may include or may not include a rubber (for example, a non-polar rubber) other than the modified rubber and the polar rubber. One kind or two or more kinds of modified rubber may be included. One kind or two or more kinds of polar rubber may be included.

The polymer alloy may include or may not include an additive such as filler, a plasticizer, and an antioxidant.

6. Cross-Linking Agent

Examples of a cross-linking agent for use in cross-linking of the polymer alloy may include sulfur and peroxides, although not particularly limited thereto.

7. Rubber Product

Examples of the rubber product may include air cleaner hoses, fuel hoses, vacuum brake hoses, oil hoses, gaskets, and CVJ boots, although not particularly limited thereto.

8. Modification Step

Modification can be performed without damaging the non-polar rubber (and thus reducing mechanical strength), by allowing nitrile oxide and the non-polar rubber to react at 0 to 180° C. The preferred temperatures are 20 to 150° C., and the more preferred temperatures are 50 to 90° C.

The reaction of modification may be performed in a solution using a solvent such as an organic solvent or may be performed by kneading the non-polar rubber and nitrile oxide with a kneader or the like without using any solvent.

The kneading may be batch processing or continuous processing.

Examples of the kneader may include kneaders such as a twin-screw kneader, a closed kneader, a Banbury mixer, and an Intermix, and extruders such as a twin-screw extruder, a single-screw extruder, and a multi-screw extruder, although not particularly limited thereto.

9. Kneading Step

Examples of the kneader for use in kneading may include those illustrated in the foregoing modification step, although not particularly limited thereto.

10. Cross-Linking Step

The method of cross-linking is not particularly limited, and a general method used for cross-linking rubber can be used.

Effects of the Invention

The present invention can produce and provide a polymer alloy formed of a non-polar rubber and a polar rubber, and a rubber product, which are improved in ozone resistance (weather resistance) while having oil resistance and can achieve high mechanical strength (in particular, tensile strength).

EXAMPLES

A modified rubber used in the present invention is described.

<1> Nitrile Oxide

First, nitrile oxide used for modification is described. For modification, two kinds of nitrile oxides, namely, 2,6-dimethoxybenzonitrile oxide and 2-methoxy-1-naphthonitrile oxide were used.

⟨1⟩ 2,6-dimethoxybenzonitrile oxide

The structural formula of 2,6-dimethoxybenzonitrile oxide is shown below (Formula 1).

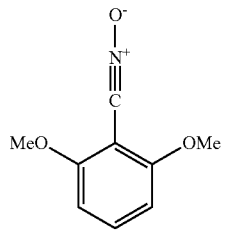

[Formula 1]

⟨2⟩ 2-methoxy-1-naphthonitrile oxide

The structural formula of 2-methoxy-1-naphthonitrile oxide is shown below (Formula 2), and a synthesis process thereof is also described.

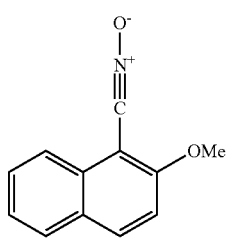

[Formula 2]

2-methoxy-1-naphthonitrile oxide was synthesized through the steps as follows (Formula 3).

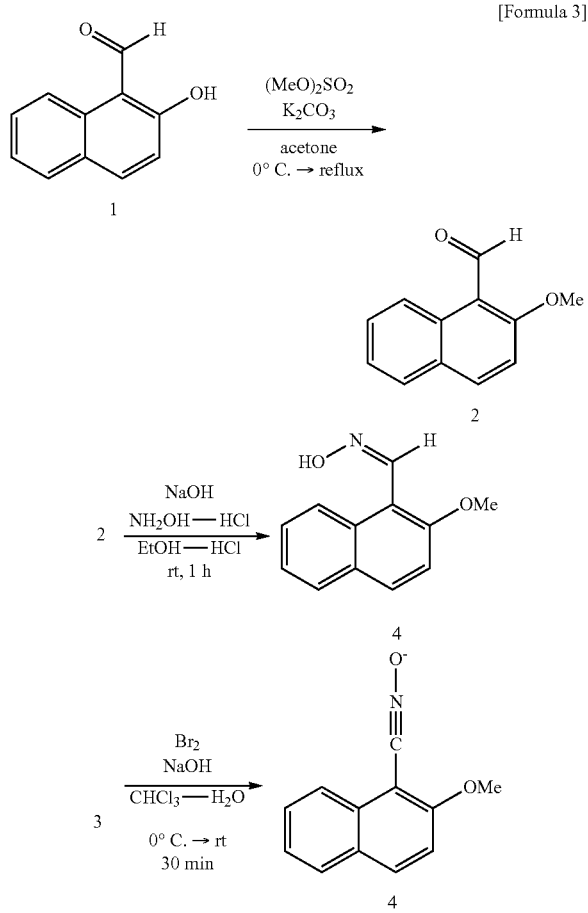

[Formula 3]

<<Step 1>> Synthesis of
2-methoxy-1-naphthaldehyde (Formula 3-2)

First, 80.0 g (0.46 mol) of commercially available 2-hydroxy-1-naphthaldehyde (1) was dissolved in 500 mL of acetone. After 76.5 g (0.56 mol) of $K_2CO_3$ was added to this, 61.7 g (0.49 mol) of $(CH_3O)_2SO_2$ was slowly added at 0° C. and stirred for 30 minutes, followed by reflux for a night. The reaction was, however, not completed, therefore 76.5 g (0.56 mol) of $K_2CO_3$ and 61.7 g (0.49 mol) of $(CH_3O)_2SO_2$ were further added and refluxed for four hours. After the product was left to cool to room temperature, salt was removed by filtration, and filtrate was collected. After removing acetone by vacuum concentration, this filtrate was extracted with a chloroform-$NaHCO_3$ aqueous solution. The extracted organic phase was dehydrated with $MgSO_4$, followed by vacuum concentration to yield 85.2 g (yield of 99%) of green solid, 2-methoxy-1-naphthaldehyde (2).

<<Step 2>> Synthesis of
2-methoxy-1-naphthaldehyde oxime (Formula 3-3)

After 260 mL of ethanol, 260 mL of water, and 49.0 g (1.23 mol) of NaOH were added to 85.2 g (0.46 mol) of 2-methoxy-1-naphthaldehyde (2), 37.5 g (0.54 mol) of $NH_2OH$—HCl was slowly added. After stirring at room temperature for one hour, 90.5 g (yield of 92%) of yellow powder, 2-methoxy-1-naphthaldehydeoxime (3) was obtained by filtration.

<<Step 3>> Synthesis of 2-methoxy-1-naphthonitrile
oxide (Formula 3-4)

After 20 mL of water, 1.19 g (29.8 mmol) of NaOH, and 20 mL of chloroform were added to 2.00 g (9.94 mmol) of 2-methoxy-1-naphthaldehyde oxime (3), 2.38 g (14.9 mmol) of $Br_2$ was slowly added dropwise at 0° C. After stirring at room temperature for 30 minutes, the reaction solution was extracted with chloroform-water. The extracted organic phase was dehydrated with $MgSO_4$, followed by vacuum concentration to yield 903 mg (yield of 46%) of brown solid, 2-methoxy-1-naphthonitrile oxide (4).

<2> Modified Rubber

The modified rubber used in Examples is now described. Four kinds of modified rubbers were produced and used in which EPDM (ethylene-propylene-diene copolymer rubber) or NR (natural rubber) was modified with 2,6-dimethoxybenzonitrile oxide or 2-methoxy-1-naphthonitrile oxide.

The EPDM used was of an ENB (5-ethylidene-2-norbornene) type having an ethylene component content of 53.0% by mass, a diene component content of 9.4% by mass, and Mooney viscosity (ML 1+4 125° C.) of 79.5.

SMR made in Malaysia was used as the NR.

⟨1⟩ One-Equivalent 2-methoxy-1-naphthonitrile
oxide-modified EPDM

One-equivalent 2-methoxy-1-naphthonitrile oxide-modified EPDM (hereinafter also called "one-equivalent naphthyl-modified EPDM") was produced by charging EPDM (120 g) into a 200 cm³ twin-screw kneader with the chamber temperature set at 70° C., kneading the EPDM with addition of one equivalent (18.3 g) of 2-methoxy-1-naphthonitrile oxide, and modifying the EPDM through a chemical reaction shown below (Formula 4) at 70° C. with a rotational speed of 30 rpm for 60 minutes. The one-equivalent naphthyl-modified EPDM of Examples produced in this manner was used as it was (in a state in which the unreacted 2-methoxy-1-naphthonitrile oxide and the like were included) without purifying operation.

Apart from this, one-equivalent naphthyl-modified EPDM was produced with the chamber temperature of the twin-screw kneader changed to 100° C. or 150° C. (reaction at 100° C. or 150° C. without changing other conditions).

[Formula 4]

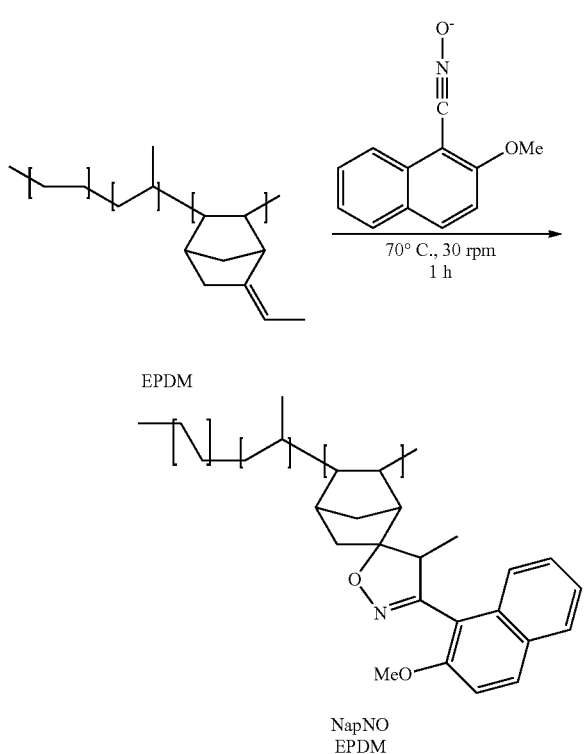

Modification Ratio

The proportion of 2-methoxy-1-naphthonitrile oxide actually added to non-conjugated double bonds (carbon-carbon double bonds) in the non-polar rubber (EPDM or NR) was obtained as a modification ratio. Here, the modification ratio of 100% means that 2-methoxy-1-naphthonitrile oxide is added to all the non-conjugated double bonds in the non-polar rubber and 50% means that 2-methoxy-1-naphthonitrile oxide is added to half the non-conjugated double bonds in the non-polar rubber.

A specific method of determining the modification ratio is as follows. After the one-equivalent naphthyl-modified EPDM produced as described above was dissolved in toluene, methanol was added to this solution to allow the rubber component (one-equivalent naphthyl-modified EPDM) to reprecipitate (deposit and precipitate), thereby separating the rubber component from the unreacted nitrile oxide (2-methoxy-1-naphthonitrile oxide). This operation was repeated twice to remove the unreacted nitrile oxide, and the resultant rubber-like precipitation (rubber component) was vacuum-dried to obtain purified one-equivalent naphthyl-modified EPDM.

The purified one-equivalent naphthyl-modified EPDM was then subjected to IR measurement, 1HNMR (solvent: deuterated chloroform) measurement, and 13C NMR measurement for calculation. The calculated modification ratio was 33% for the one produced with the chamber temperature of 70° C., 33% for the one produced with the chamber temperature of 100° C., and 32% for the one produced with the chamber temperature of 150° C.

The modification ratios of the modified rubbers described later (0.2-equivalent 2-methoxy-1-naphthonitrile oxide-modified EPDM and 0.2-equivalent 2-methoxy-1-naphthonitrile oxide-modified NR) were also calculated in the same manner.

⟨2⟩ 0.2-equivalent 2-methoxy-1-naphthonitrile oxide-modified EPDM 0.2-equivalent 2-methoxy-1-naphthonitrile oxide-modified EPDM (hereinafter also called "0.2-equivalent naphthyl-modified EPDM") was produced in the same manner as the one-equivalent naphthyl-modified EPDM except that the additive amount of 2-methoxy-1-naphthonitrile oxide was changed to 0.2 equivalent (the chamber temperature of the twin-screw kneader was 70° C.) The modification ratio was 9%. The 0.2-equivalent naphthyl-modified EPDM of Examples thus produced was used as it was (in a state in which the unreacted 2-methoxy-1-naphthonitrile oxide and the like were included) without purifying operation.

⟨3⟩ One-equivalent 2,6-dimethoxybenzonitrile oxide-modified EPDM

One-equivalent 2,6-dimethoxybenzonitrile oxide-modified EPDM (hereinafter also called "one-equivalent phenyl-modified EPDM") was produced in the same manner as the one-equivalent naphthyl-modified EPDM except that one equivalent of 2,6-dimethoxybenzonitrile oxide was used in place of 2-methoxy-1-naphthonitrile oxide (the chamber temperature of the twin-screw kneader was 70° C.). The one-equivalent phenyl-modified EPDM of Examples thus produced was used as it was (in a state in which the unreacted 2,6-dimethoxybenzonitrile oxide and the like were included) without purifying operation.

⟨4⟩ 0.2-equivalent 2-methoxy-1-naphthonitrile oxide-modified NR 0.2-equivalent 2-methoxy-1-naphthonitrile oxide-modified NR (hereinafter also called "0.2-equivalent naphthyl-modified NR") was produced in the same manner as the one-equivalent naphthyl-modified EPDM except that NR was used in place of EPDM and the additive amount of 2-methoxy-1-naphthonitrile oxide was changed to 0.2 equivalent (the chamber temperature of the twin-screw kneader was 70° C.). The modification ratio was 10%. The 0.2-equivalent naphthyl-modified NR of Examples thus produced was used as it was (in a state in which the unreacted 2-methoxy-1-naphthonitrile oxide and the like were included) without purifying operation.

Using the four kinds of modified rubbers as described above, 11 kinds of cross-linked rubber bodies were produced as Examples of the present invention. Four kinds of cross-linked rubber bodies were also produced as Comparative Examples. The ozone resistance and mechanical strength were measured for all of them, and the oil resistance was measured for some of them (Example 3, Comparative Examples 1 and 4). The measurement results are shown in Table 1, and the respective compositions (in parts by mass) of the rubber components are also shown in Table 1. Microscope photographs of part of surfaces of Example 3 and Comparative Example 1 are shown in FIG. 1 (Example 3) and FIG. 2 (Comparative Example 1).

TABLE 1

| | | Example | | | | | | | | | | | Comparative Example | | | |
|---|---|---|---|---|---|---|---|---|---|---|---|---|---|---|---|---|
| | | 1 | 2 | 3 | 4 | 5 | 6 | 7 | 8 | 9 | 10 | 11 | 1 | 2 | 3 | 4 |
| Rubber composition (parts by mass) | EPDM | | | | | 20 | | | | | | | 40 | | 40 | |
| | One-equivalent naphthyl-modified EPDM | 80 | 60 | 40 | 20 | 20 | | | | | | 40 | | | | |
| | 0.2-equivalent naphthyl-modified EPDM | | | | | | 60 | 40 | 20 | | | | | | | |
| | One-equivalent phenyl-modified EPDM | | | | | | | | | 40 | | | | | | |
| | CHP-modified EPDM | | | | | | | | | | | | | | | 40 |
| | NR | | | | | | | | | | | | | 40 | | |
| | 0.2-equivalent naphthyl-modified NR | | | | | | | | | | 40 | | | | | |
| | NBR | 20 | 40 | 60 | 80 | 60 | 40 | 60 | 80 | 60 | 60 | | 60 | 60 | | 60 |
| | ACM | | | | | | | | | | | 60 | | | 60 | |
| Ozone resistance | 24 h | NC | NC | NC | NC | NC | NC | NC | NC | NC | A-1 | NC | A-1 | NC | C-3 | break | NC |
| | 72 h | NC | NC | NC | NC | NC | A-1 | B-1 | C-2 | NC | B-3 | NC | B-1 | C-4 | — | NC |
| | 161 h | NC | NC | NC | eA-1 | NC | A-1 | B-1 | C-3 | A-1 | B-4 | NC | B-2 | break | — | NC |
| Mechanical strength | Tensile strength (Mpa) | 7.0 | 6.3 | 6.3 | 7.0 | 6.4 | 5.5 | 5.7 | 5.0 | 7.3 | 9.5 | 1.5 | 5.5 | 8.1 | 1.0 | 4.4 |
| | Elongation (%) | 360 | 350 | 360 | 350 | 300 | 290 | 280 | 260 | 310 | 460 | 350 | 215 | 300 | 200 | 200 |
| | M100 (Mpa) | 1.3 | 1.3 | 1.3 | 1.4 | 1.4 | 1.5 | 1.6 | 1.6 | 1.6 | 1.0 | 0.4 | 1.7 | 1.5 | 0.5 | 1.9 |
| Oil resistance | Volume swell ΔV (%) | | | 41 | | | | | | | | | 51 | | | 40 |

The following rubbers were used in Examples and Comparative Examples.

The same EPDM and NR that were used in the modified rubbers were used.

The acrylonitrile-butadiene rubber (NBR) having 42.5% by mass of combined acrylonitrile (AN) and Mooney viscosity (ML 1+4 150° C.) of 77.5 was used.

The acrylic ester-2-chloroethyl vinyl ether copolymer rubber (ACM) having 1% by mass of a carboxylic acid-based cross-linking group in acrylic ester (EA) composition with Mooney viscosity (ML 1+4 100° C.) of 33.0 was used.

The CHP-modified EPDM in which the EPDM described above was modified with CHP (cumene hydroperoxide: the trade name "PERCUMYL H-80" manufactured by NOF CORPORATION, 80% pure) by a known method (see the paragraph 0075 of Patent Document 2) was used.

Examples are described now.

In Example 3, 3.8 g of PERCUMYL D (trade name, dicumyl peroxide: 40% pure) manufactured by NOF CORPORATION as a cross-linking agent was added to rubber components of 40 parts by mass (19 g) of one-equivalent naphthyl-modified EPDM (density: 0.87 g/cm$^3$) and 60 parts by mass (28 g) of NBR (density: 1.00 g/cm$^3$), and a 70 cm$^3$ LABO PLASTOMILL (Toyo Seiki Seisaku-sho, Ltd.) preheated to 70° C. was used for kneading with a rotational speed of 50 rpm for 10 minutes. Cross-linking was thereafter performed under the conditions of 180° C. and 10 MPa held for 15 minutes using a heat press machine to produce a sheet-like cross-linked rubber body.

In Example 1, a sheet-like cross-linked rubber body was produced in the same manner as in Example 3 except that the rubber components were changed to 80 parts by mass of one-equivalent naphthyl-modified EPDM and 20 parts by mass of NBR.

In Example 2, a sheet-like cross-linked rubber body was produced in the same manner as in Example 3 except that the rubber components were changed to 60 parts by mass of one-equivalent naphthyl-modified EPDM and 40 parts by mass of NBR.

In Example 4, a sheet-like cross-linked rubber body was produced in the same manner as in Example 3 except that the rubber components were changed to 20 parts by mass of one-equivalent naphthyl-modified EPDM and 80 parts by mass of NBR.

In Example 5, a sheet-like cross-linked rubber body was produced in the same manner as in Example 3 except that the rubber components were changed to 20 parts by mass of EPDM, 20 parts by mass of one-equivalent naphthyl-modified EPDM, and 60 parts by mass of NBR.

In Example 6, a sheet-like cross-linked rubber body was produced in the same manner as in Example 3 except that the rubber components were changed to 60 parts by mass of 0.2-equivalent naphthyl-modified EPDM and 40 parts by mass of NBR.

In Example 7, a sheet-like cross-linked rubber body was produced in the same manner as in Example 3 except that the rubber components were changed to 40 parts by mass of 0.2-equivalent naphthyl-modified EPDM and 60 parts by mass of NBR.

In Example 8, a sheet-like cross-linked rubber body was produced in the same manner as in Example 3 except that the rubber components were changed to 20 parts by mass of 0.2-equivalent naphthyl-modified EPDM and 80 parts by mass of NBR.

In Example 9, a sheet-like cross-linked rubber body was produced in the same manner as in Example 3 except that the rubber components were changed to 40 parts by mass of one-equivalent phenyl-modified EPDM and 60 parts by mass of NBR.

In Example 10, a sheet-like cross-linked rubber body was produced in the same manner as in Example 3 except that the rubber components were changed to 40 parts by mass of 0.2-equivalent naphthyl-modified NR and 60 parts by mass of NBR.

In Example 11, a sheet-like cross-linked rubber body was produced in the same manner as in Example 3 except that the rubber components were changed to 40 parts by mass of one-equivalent naphthyl-modified EPDM and 60 parts by mass of ACM.

Comparative Examples are described now.

In Comparative Example 1, a sheet-like cross-linked rubber body was produced in the same manner as in Example 3 except that the rubber components were changed to 40 parts by mass of EPDM and 60 parts by mass of NBR.

In Comparative Example 2, a sheet-like cross-linked rubber body was produced in the same manner as in Example 3 except that the rubber components were changed to 40 parts by mass of NR and 60 parts by mass of NBR.

In Comparative Example 3, a sheet-like cross-linked rubber body was produced in the same manner as in Example 3 except that the rubber components were changed to 40 parts by mass of EPDM and 60 parts by mass of ACM.

In Comparative Example 4, a sheet-like cross-linked rubber body was produced in the same manner as in Example 3 except that the rubber components were changed to 40 parts by mass of CHP-modified EPDM and 60 parts by mass of NBR.

The test methods are described now.

(1) Ozone Resistance Test

An ozone resistance test was performed in accordance with JIS K 6259 "Rubber, vulcanized or thermoplastic—Determination of ozone resistance" under the conditions of a test temperature of 40° C., an ozone concentration of 50 pphm, a stretch ratio of 10%, and test times of 24 h (hours), 72 h, and 161 h. The state of cracks was observed. NC means no cracks.

(2) Tensile Test

A tensile test was performed in accordance with JIS K 6251 "Rubber, vulcanized or thermoplastic—Determination of tensile stress-strain properties" using a test piece of Dumbbell No. 7 at room temperature with a tensile speed of 20±20 mm/min. The tensile strength, elongation (elongation at break), and M100 (tensile stress at 100% elongation) were obtained.

(3) Oil Resistance Test

An oil resistance test was performed in accordance with JIS K 6258 "Rubber, vulcanized or thermoplastic—Determination of the effect of liquids" by immersion in No. 3 oil (IRM903) at 100° C. for 72 h (hours). The volume swell ΔV (%) was then determined.

The microscope photographs in FIGS. 1 and 2 are described now.

In FIG. 1, a region including a relatively dark (black) section is the phase of the modified EPDM (one-equivalent naphthyl-modified EPDM), and a region including a relatively pale (gray) section is the phase of NBR. The modified EPDM is dispersed in the NBR.

In FIG. 2, a region including a relatively dark (black) section is the phase of EPDM, and a region including a relatively pale (gray) section is the phase of NBR. The EPDM is dispersed in the NBR.

Based on the comparison between FIG. 1 and FIG. 2, the dispersion state of the modified EPDM in the NBR is finer than that of the EPDM in the NBR.

Based on the foregoing, in the polymer alloys (Examples 1 to 8) formed of 80 to 20 parts by mass of the modified EPDM in which EPDM was modified with 2-methoxy-1-naphthonitrile oxide (hereinafter also called "naphthyl-modified EPDM") and 20 to 80 parts by mass of NBR, the polymer alloy (Example 9) formed of 40 parts by mass of the modified EPDM in which EPDM was modified with 2,6-dimethoxybenzonitrile oxide (hereinafter also called "phenyl-modified EPDM") and 60 parts by mass of NBR, and the polymer alloy (Example 11) formed of 40 parts by mass of naphthyl-modified EPDM and 60 parts by mass of ACM, cracks did not appear for 24 hours or longer in the ozone resistance test.

In particular, in the polymer alloys (Examples 1 to 5) formed of 80 to 20 parts by mass of one-equivalent naphthyl-modified EPDM and 20 to 80 parts by mass of NBR, the polymer alloy (Example 9) formed of 40 parts by mass of phenyl-modified EPDM and 60 parts by mass of NBR, and the polymer alloy (Example 11) formed of 40 parts by mass of naphthyl-modified EPDM and 60 parts by mass of ACM, cracks did not appear for 72 hours or longer in the ozone resistance test.

On the other hand, in the polymer alloys (Comparative Examples 1 and 3) formed of 40 parts by mass of EPDM and 60 parts by mass of NBR or ACM, cracks appeared within 24 hours in the ozone resistance test.

Based on the comparison between Examples 3, 5, 7, 9 and Comparative Example 1, the polymer alloy formed of NBR and the naphthyl-modified EPDM or the phenyl-modified EPDM blended in place of EPDM was improved in ozone resistance and mechanical strength (in particular, tensile strength). This is attributable to the fact that the naphthyl-modified EPDM and the phenyl-modified EPDM have good compatibility with NBR (see FIG. 1 and FIG. 2).

Based on the comparison between Example 3 and Comparative Example 1, the polymer alloy formed of NBR and the naphthyl-modified EPDM blended in place of EPDM was improved in oil resistance. This is attributable to the fact that the naphthyl-modified EPDM is improved in oil resistance by modification compared with EPDM, and the fact that it has good compatibility with NBR (see FIG. 1 and FIG. 2).

Based on the comparison between Examples 3, 7, 9 and Comparative Example 4, the polymer alloy formed of NBR and the naphthyl-modified EPDM or the phenyl-modified EPDM blended in place of EPDM was improved in mechanical strength (in particular, tensile strength), whereas the polymer alloy formed of NBR and the CHP-modified EPDM blended in place of EPDM, in which EPDM was modified with CHP, was reduced in mechanical strength (in particular, tensile strength). This is attributable to the fact that the naphthyl-modified EPDM and the phenyl-modified EPDM are formed by modifying EPDM at a temperature of 70° C. so that the modification is achieved without damaging EPDM (reducing the mechanical strength). The polymer alloy including the CHP-modified EPDM was improved in both ozone resistance and oil resistance.

Based on the comparison between Example 10 and Comparative Example 2, the polymer alloy formed of NBR and the modified NR blended in place of NR, in which NR was modified with 2-methoxy-1-naphthonitrile oxide, was improved in all of ozone resistance, mechanical strength (in particular, tensile strength), and oil resistance.

Based on the comparison between Example 11 and Comparative Example 3, the polymer alloy formed of ACM and the naphthyl-modified EPDM blended in place of EPDM was improved in all of ozone resistance, mechanical strength (in particular, tensile strength), and oil resistance.

It should be noted that the present invention is not limited to the foregoing Examples and can be modified as appropriate and embodied within a range that does not depart from the spirit of the invention.

The invention claimed is:

1. A polymer alloy comprising:
   a modified rubber in which a non-polar rubber having a non-conjugated double bond is modified with nitrile oxide of an aromatic nitrile oxide derivative having a substituent group at an ortho position of a nitrile oxide group of an aromatic nitrile oxide in which the nitrile oxide group is bonded to an aromatic ring; and
   a polar rubber.

2. The polymer alloy according to claim 1, wherein the aromatic nitrile oxide is benzonitrile oxide or naphthonitrile oxide.

3. The polymer alloy according to claim 1, wherein the substituent group is an alkyl group or an alkoxy group.

4. The polymer alloy according to claim 1, wherein the non-polar rubber is EPDM or NR.

5. The polymer alloy according to claim 1, wherein the polar rubber is a nitrile rubber or an acrylic rubber.

6. A rubber product formed by cross-linking the polymer alloy according to claim 1.

7. A production method of a polymer alloy, comprising the steps of:
    allowing nitrile oxide of an aromatic nitrile oxide derivative having a substituent group at an ortho position of a nitrile oxide group of an aromatic nitrile oxide in which the nitrile oxide group is bonded to an aromatic ring to react with a non-polar rubber having a non-conjugated double bond at 0 to 180° C. to modify the non-polar rubber into a modified rubber; and
    kneading the modified rubber and a polar rubber.

8. The production method of a polymer alloy according to claim 7, wherein the aromatic nitrile oxide is benzonitrile oxide or naphthonitrile oxide.

9. The production method of a polymer alloy according to claim 7, wherein the substituent group is an alkyl group or an alkoxy group.

10. The production method of a polymer alloy according to claim 7, wherein the non-polar rubber is EPDM or NR.

11. The production method of a polymer alloy according to claim 7, wherein the polar rubber is a nitrile rubber or an acrylic rubber.

12. A production method of a rubber product, comprising the steps of:
    allowing nitrile oxide of an aromatic nitrile oxide derivative having a substituent group at an ortho position of a nitrile oxide group of an aromatic nitrile oxide in which the nitrile oxide group is bonded to an aromatic ring to react with a non-polar rubber having a non-conjugated double bond at 0 to 180° C. to modify the non-polar rubber into a modified rubber;
    kneading the modified rubber and a polar rubber to form a polymer alloy; and
    cross-linking the polymer alloy.

13. The production method of a rubber product according to claim 12, wherein the aromatic nitrile oxide is benzonitrile oxide or naphthonitrile oxide.

14. The production method of a rubber product according to claim 12, wherein the substituent group is an alkyl group or an alkoxy group.

15. The production method of a rubber product according to claim 12, wherein the non-polar rubber is EPDM or NR.

16. The production method of a rubber product according to claim 12, wherein the polar rubber is a nitrile rubber or an acrylic rubber.

* * * * *